UNITED STATES PATENT OFFICE.

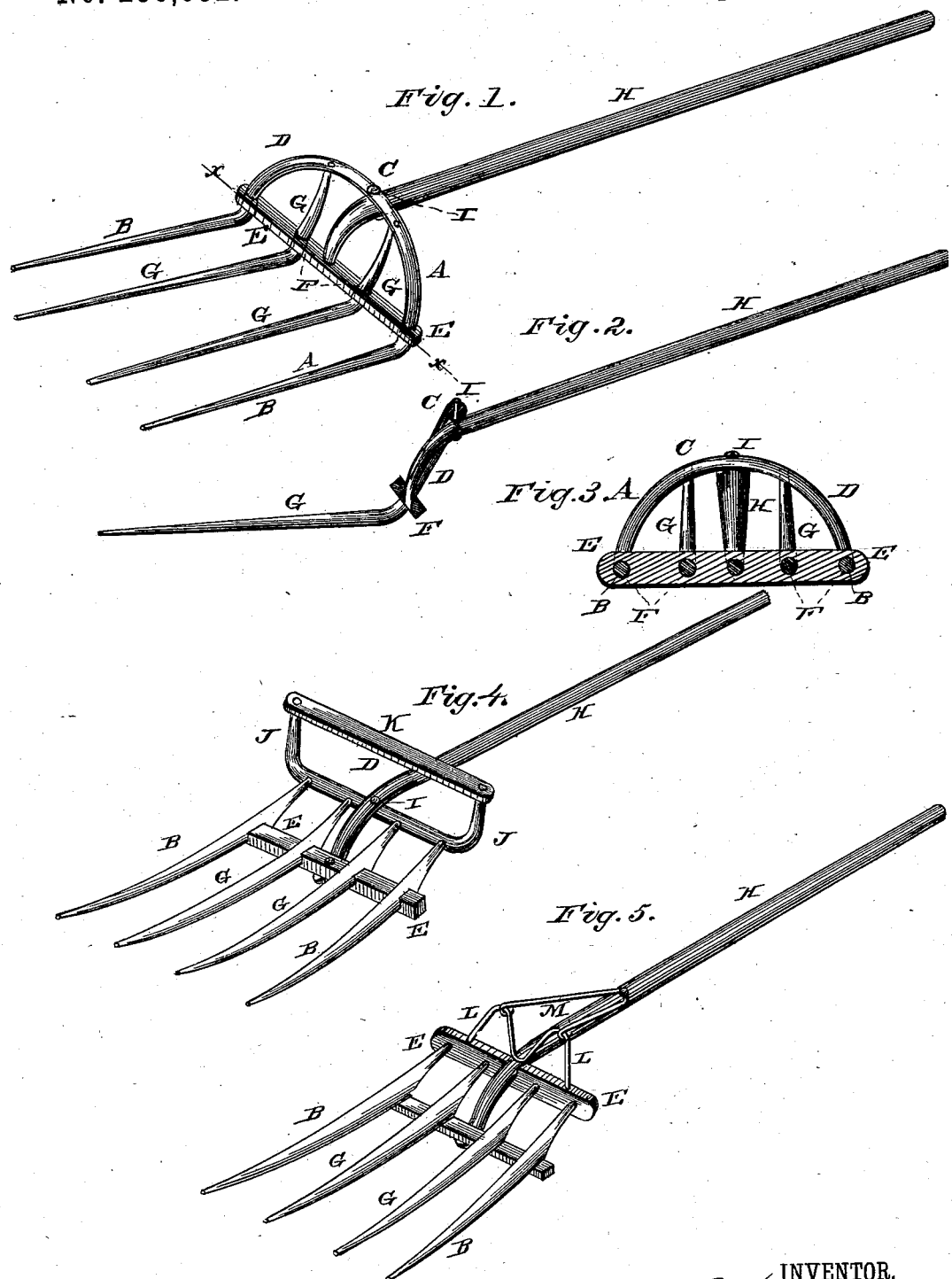

FRANCIS L. BRANDON, OF HICKSVILLE, OHIO.

PITCHFORK.

SPECIFICATION forming part of Letters Patent No. 256,632, dated April 18, 1882.

Application filed March 9, 1882. (No model.)

To all whom it may concern:

Be it known that I, FRANCIS L. BRANDON, of Hicksville, in the county of Defiance and State of Ohio, have invented certain new and useful Improvements in Pitchforks; and I do hereby declare that the following is a full, clear, and exact description of the invention, which will enable others skilled in the art to which it appertains to make and use the same, reference being had to the accompanying drawings, which form a part of this specification.

This invention has for its object to produce a simple, durable, inexpensive, and efficient pitchfork, and is especially adapted to be used in handling barley and the like.

In the drawings, Figure 1 is a perspective view of my improved pitchfork; Fig. 2, a longitudinal sectional view thereof; Fig. 3, a cross section on the line $x\,x$, Fig. 1; Fig. 4, a perspective view of a modified form of fork, and Fig. 5 a like view of another modification.

Referring by letters to the drawings, A designates a single strip or piece of wood, which forms the end tines, B B, and is bowed or arched at its rear or middle part, C, to form a back, D, to the fork proper to prevent the barley from slipping off the fork in that direction.

E denotes the cross piece or brace, in which is formed a series of openings, F, by which it may be slipped or inserted over the tines and secured thereon at the curved vertex of the right angle formed by the turned-up back D, so that the cross-piece will not touch the ground and obstruct the movement of the fork when it is run close to the ground in use.

G G designate the middle tines, of which there may be any desired number; and H, the usual rod or handle by which the fork is used. The rear ends of the tines G, after passing through the openings F of cross-piece E, are turned up and secured in openings in the arch C. The handle H is secured to the under side of the latter by a pin or bolt, I, and from thence the securing end is continued down and inserted in the central opening in the cross-piece E.

It will thus be seen that by this novel construction I am enabled to effect a great saving in the material of which the fork is constructed, but few parts being necessary, and these are securely and substantially held together without the aid of pins and bolts, save the one that secures the handle to the arch.

In the modification shown in Fig. 4 of the drawings the back D, instead of being formed by the arch of the tines, is constituted by a single U-shaped piece of wood, J, having a cross strip or piece, K, connecting its top ends. In this case the rear ends of the tines are secured to the lower part of the U-shaped piece J.

In Fig. 5 I have shown the cross-piece E simply provided with a wire bail, L, to form the back, provided with a rearward brace, M, of like material.

Numerous changes and modifications may be made in the construction and arrangement of the parts forming the back D without departing from the spirit of my invention, an important element of which is the provision of this back for use as a bail in handling the fork and for the purposes already specified.

Having thus described my invention, I claim and desire to secure by Letters Patent of the United States—

1. The single strip or piece A, forming the end tines, B B, and bowed or arched at its center to form an upturned back, D, as and for the purpose specified.

2. The combination, with the arched piece A, forming the two end tines, and with the middle tines, of the cross brace or strip provided with openings through which the tines pass and secured on the latter, as herein shown and specified.

3. The combination, with the single strip A, forming the end tines, B B, and bowed or arched at its middle portion to form a back, D, and the cross-piece E, having a series of openings, F, of the middle tines, the rear ends of which are passed through these openings and then turned upwardly and secured to the arch C, as herein shown and specified.

4. The combination of the arched piece A, forming the end tines, B B, the cross piece or strip E, having a series of openings, F, the middle tines having upturned ends, and the rod or handle secured to the arch and cross-piece, substantially as herein shown and described.

In testimony that I claim the foregoing as my own I have hereto affixed my signature in presence of two witnesses.

FRANCIS L. BRANDON.

Witnesses:
STILMAN BLODGET,
FRANK MARPLE.